United States Patent [19]
Lagerbauer et al.

[11] Patent Number: 4,745,397
[45] Date of Patent: May 17, 1988

[54] REMOTE CONTROL DEVICES

[75] Inventors: Norbert Lagerbauer, Frankfurt; Dietmar Adler; Peter Hartwein, both of Konigstein, all of Fed. Rep. of Germany

[73] Assignee: Analog and Digital Systems, Inc., Wilmington, Mass.

[21] Appl. No.: 810,699

[22] Filed: Dec. 19, 1985

[30] Foreign Application Priority Data

Dec. 21, 1984 [DE] Fed. Rep. of Germany ....... 3446806

[51] Int. Cl.$^4$ .............................................. G06F 3/02
[52] U.S. Cl. .......................... 340/365 VL; 340/365 R; 358/194.1
[58] Field of Search ....... 340/365 VL, 365 R, 825.72; 358/194.1; 179/90 B, 90 BD, 90 CS; 455/90, 128, 352, 353

[56] References Cited

U.S. PATENT DOCUMENTS

| Re. 31,649 | 8/1986 | Brodbeck | 179/90 BD |
|---|---|---|---|
| 3,560,964 | 2/1971 | Bedell et al. | 340/365 VL |
| 3,600,592 | 8/1971 | Mahan | |
| 4,337,480 | 6/1982 | Bourassin et al. | 358/194.1 |
| 4,386,436 | 5/1983 | Kocher et al. | 358/194.1 |
| 4,398,086 | 8/1983 | Smith | 340/365 VL |
| 4,595,798 | 6/1986 | Brodbeck | 179/90 BD |

FOREIGN PATENT DOCUMENTS 59105164 8/1982 Japan.
58-117023 7/1983 Japan.

Primary Examiner—John W. Caldwell, Sr.
Assistant Examiner—Mahmoud Fatahi-Yar
Attorney, Agent, or Firm—Davis Hoxie Faithfull & Hapgood

[57] ABSTRACT

A remote control device for the joint or successive remote control of radio receivers, record players, tape recorders, television receivers and the like comprises a body having a plurality of control buttons for the items of equipment to be remotely controlled. The device further has a plurality of superimposed drop sheets each of which is associated with a specific item of equipment or function type. With the aid of a flap which is pivotally mounted on the body and a gripper provided on the flap, it is possible to raise the drop sheets, so that only that particular sheet required for the desired function type is present on the device. The drop sheets have openings through which the operating buttons can project. In the vicinity of these operating buttons a reference to a specific function is provided on each drop sheet.

11 Claims, 6 Drawing Sheets

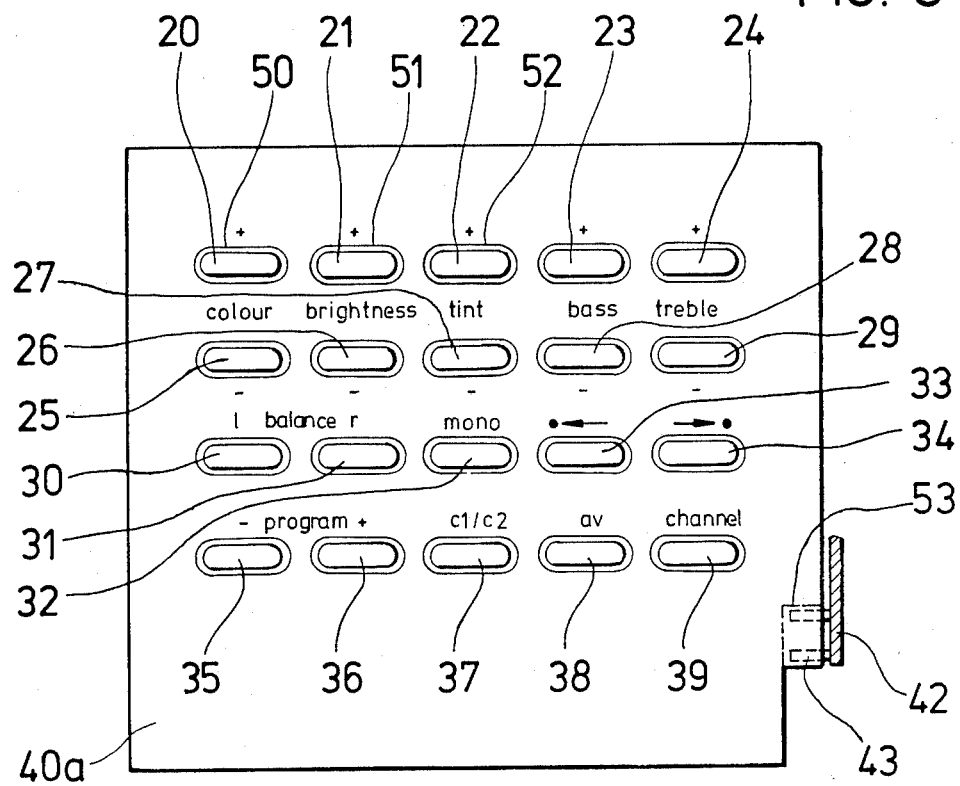

REMOTE CONTROL DEVICES

FIELD OF THE INVENTION

This invention relates to a remote control device for the joint or successive remote control of radio receivers, record players, tape recorders, television receivers or the like.

BACKGROUND OF THE INVENTION

Remote control devices have long been known in the radio and television fields and they make it possible, preferably without the use of wires, to carry out switching operations on equipment. The best known of such remote control devices are those used for the remote control of television receivers, in which the instruction signals are transmitted ultrasonically or by infrared light. Television receivers can be switched on and off by means of such remote control devices. It is also possible to select different television programs or to change the volume, color saturation and other functions. However, these known remote control devices are generally only intended for the remote control of a single item of equipment, e.g. a television receiver or a video recorder. Since nowadays many households have several items of electronic equipment, disadvantages result from the association of a separate remote control device with each individual radio, television receiver or video recorder, because this requires the existence and operation of several remote control devices.

Remote control devices have already been proposed which make it possible to control remotely several items of equipment. A special problem in the design of such remote control devices is that a plurality of functions has to be fulfilled. If a particular button is associated with each of these functions, a very unwieldy remote control device is obtained which is difficult to supervise. A modern home can have as many as ten remotely controlled items of equipment, i.e. a television receiver, a record player, a tape recorder, an audio cassette player, a video recorder, a picture record player, a compact disc player, a tuner, an amplifier and a video camera. If it is also borne in mind that modern colour televisions fulfil numerous additional functions, e.g. display text, video text, stereo or two-channel sound, there are so many functions that a hundred operating buttons or even more would be necessary. A remote control device with so many buttons would be unwieldy and difficult to operate.

Remote control devices for several items of equipment have also been proposed in which all or several buttons carry out several functions. Generally a changeover switch is provided, so that it is possible to switch between individual items of equipment which have to be remotely controlled. In the "television receiver" position, the individual buttons of the remote control device will then have different functions to those e.g. in the "tuner" position. Whereas it is relatively easy to bring about switching from "television" to "tuner" etc. by using a slide switch or the like, it is much more difficult to show to the remote control device user which particular function is instantaneously associated with a particular key. Attempts have been made to solve this problem in that the different functions are written under the individual keys. This made it possible to keep the particular functions for each equipment to be remotely controlled in a specific color. Thus, e.g. in the "television" position, the red words under a key applied, whereas in the "record player" position the green terms applied. However, it is difficult to follow this solution, because several terms have to be written under one another, which either leads to barely legible inscriptions or to a need for a very large amount of space for these inscriptions.

SUMMARY OF THE INVENTION

The object of the invention is to provide a remote control device in which at a given time only one term is associated with one remote control button, although the latter is used for the remote control of a plurality of functions of a plurality of items of equipment to be remotely controlled.

Accordingly, the present invention provides a remote control device for the joint or successive remote control of radio receivers, record players, tape recorders, television receivers and the like, the remote control device comprising a body having means for setting thereon controls for a particular item of equipment to be remotely controlled and said remote control device having a number of control members on said body enabling several functions to be set on the particular item of equipment to be remotely controlled, wherein said means for setting said controls of the remote control device comprise a plurality of drop sheets, each drop sheet being associated with a respective item of equipment to be remotely controlled and carrying indications of the functions of the control members on said remote control device for the remote control of said associated item of equipment.

The advantage resulting from the invention is more particularly that it is possible to obtain a very compact multifunction remote control device. In addition, the handling of such a device is very simple, which is particularly important, because it is mainly used by technical amateurs.

BRIEF DESCRIPTION OF THE DRAWINGS

The invention will now be further described, by way of example, with reference to the drawings, in which:

FIG. 3 shows a drop sheet for the "television" function;

FIG. 4 shows a drop sheet for the "satellite tuner" function;

DESCRIPTION OF PREFERRED EMBODIMENT

Figure 1:
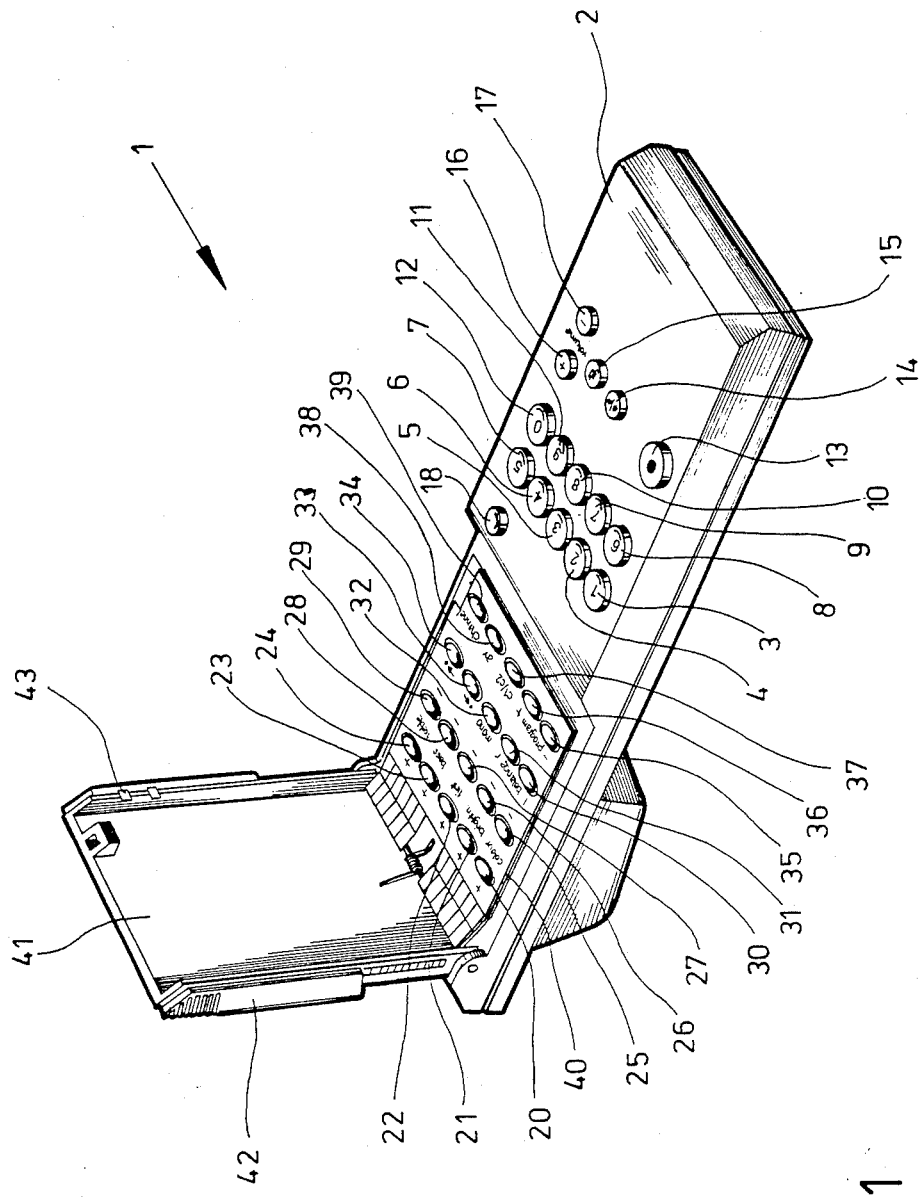
FIG. 1 is a perspective view of one embodiment of a remote control device according to the invention.

Reference will first be made to FIG. 1 of the drawings in which the remote control device 1 has a body comprising a lower part 2 on which are provided several buttons 3 thru 18, whose functions will be described hereinafter. On an upper part 19 of the body of the remote control device, which is located below the plane of the lower part 2, further operating buttons 20 thru 39 are provided having different functions associated therewith. Buttons 20 thru 39 are surrounded by several superimposed drop sheets 40, whereby each of these sheets can be associated with a specific item of equipment or a specific function type, e.g. a record player. A flap 41 is pivotally mounted at the upper end of the remote control device 1, which flap can be folded down onto the operating buttons. The pivotable flap 41 is connected to a slider 42, to which is connected a gripper 43. The gripper 43 makes it possible to grip one or more of the sheets 40 and to carry the same upwards. The position of the gripper 43 decides which sheets are carried upwards. It is therefore possible by sliding the slider 42 into a desired position, to place on the top of the device 1 a sheet 40 carrying precisely those inscriptions which are associated with the equipment to be remotely controlled.

Figure 2:
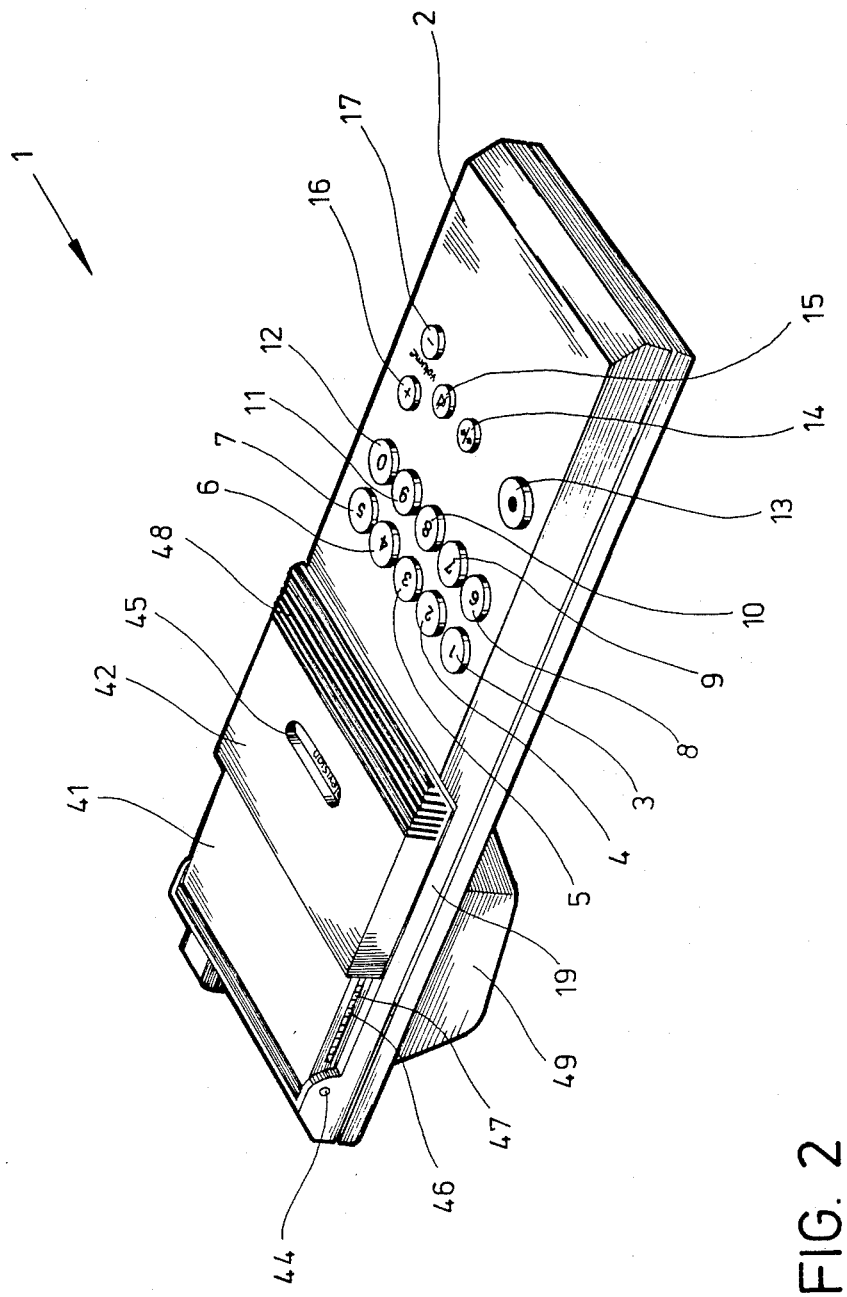
FIG. 2 is a perspective view of the remote control device shown in FIG. 1 but in which a movable flap has been moved to the folded down position.

FIG. 2 shows the remote control device 1 shown in FIG. 1, but with the flap 41 in the folded down position. It is once again possible to see the operating buttons 3 thru 17 on the lower part 2. The buttons of the upper part 19 are in this case covered by the flap 41. The flap 41 is pivotable about a rotary shaft 44 which is mounted in lugs provided on the device 1. Roughly in its center the slider 42 has an elongated slot 45 through which it is possible to see a particular term, e.g. video recorder. This means that in the position shown in FIG. 2, the video recorder control or operating functions are activated. The not visible gripper 43 engages under a specific number of drop sheets 40, so that when the flip 41 is raised and brought into the position shown in FIG. 1, with buttons 20 thru 39 is in each case associated a rerm indicating the correct function in the case of video recorder operation. The corresponding association of the particular circuits to the specific functions can be brought about by contacts 46,47, which can be activated as a function of the position of the slider 42. It would also be conceivable for the gripper 43 also to assume this function.

In order that the gripper 43 grips the correct number of drop sheets 40, said sheets are provided on their edges with in each case different cutouts. Whereas in a lower position the gripper 43 can e.g. grip only one drop sheet having no or only a small lateral cutout, in an upper position it also grips drop sheets with a large lateral cutout. The width of the particular cutout at least corresponds to the width of the gripper 43.

The slider 42 is provided with corrugations, which make it easier to operate the same. A casing part 49 is provided below the upper part 19 which can receive batteries or accumulators required for the power supply of the remote control device 1. The "addresses", which can be controlled in a preferred manner by the remote control device are television, video text, display text, video recorder, satellite tuner, audio and compact disc. This means that in strict terms a drop sheet is not associated with a specific item of equipment, e.g. a television receiver, but a particular operating mode of this equipment. A particular function is also associated with buttons 3 thru 12, as a function of the particular position of the slider 42. In the case of the "compact disc" position, it is possible to choose with said buttons the title number, whereas in the "satellite tuner" position, said buttons can be used for choosing the channels or programs. In the "television" position, the buttons are used for selecting the particular channels or programs and in the "btx" position the buttons are used for feeding in a code, etc. whereas in the "vtx" position (=videotext) they can give the page numbers.

FIG. 3 shows a drop sheet 40a with which is associated the "television" function. This drop sheet 40a is located on the upper surface of the upper part 19 when the word "television" appears in the elongated slot 45. The individual buttons 20 thru 39 in each case project through respective openings in said sheet 40a. Only the first three openings 50,51,52 are given reference numerals. Part of the slider 42 and the gripper 43 is shown at the edge of the drop sheet 40a. It can be seen that this sheet 40a is held by the gripper 43. However, the underlying drop sheet 40b, whose cutout on the right-hand lower edge is larger and ends at the broken line 53, is not gripped by the gripper 43. The sheet 40b is shown in detail in FIG. 4 and it will be seen that it bears inscriptions for a satellite tuner.

Figure 5:
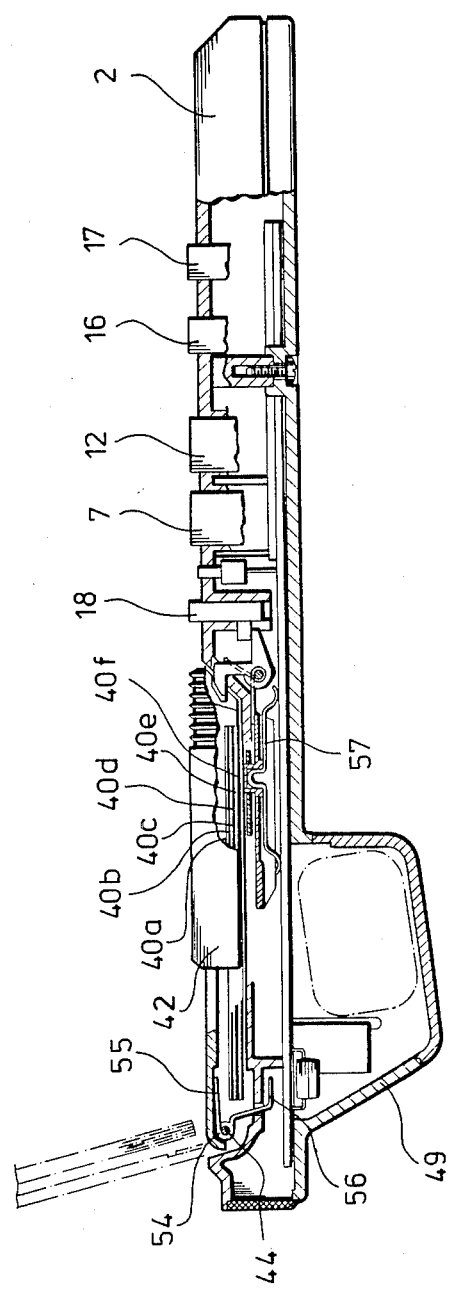
FIG. 5 is a vertical cross-section through the remote control device shown in FIG. 1.

FIG. 5 is a cross-section thru the remote control device according to the invention. It is possible to see individual drop sheets 40a thru 40f, as well as the rotary shaft 44, about which is wound a spring 54 with arms 55 and 56. It is also possible to see a device 57 which is connected to the displaceable gripper 43 and which operates specific electric circuits as a function of the position occupied by the gripper.

Figure 6:
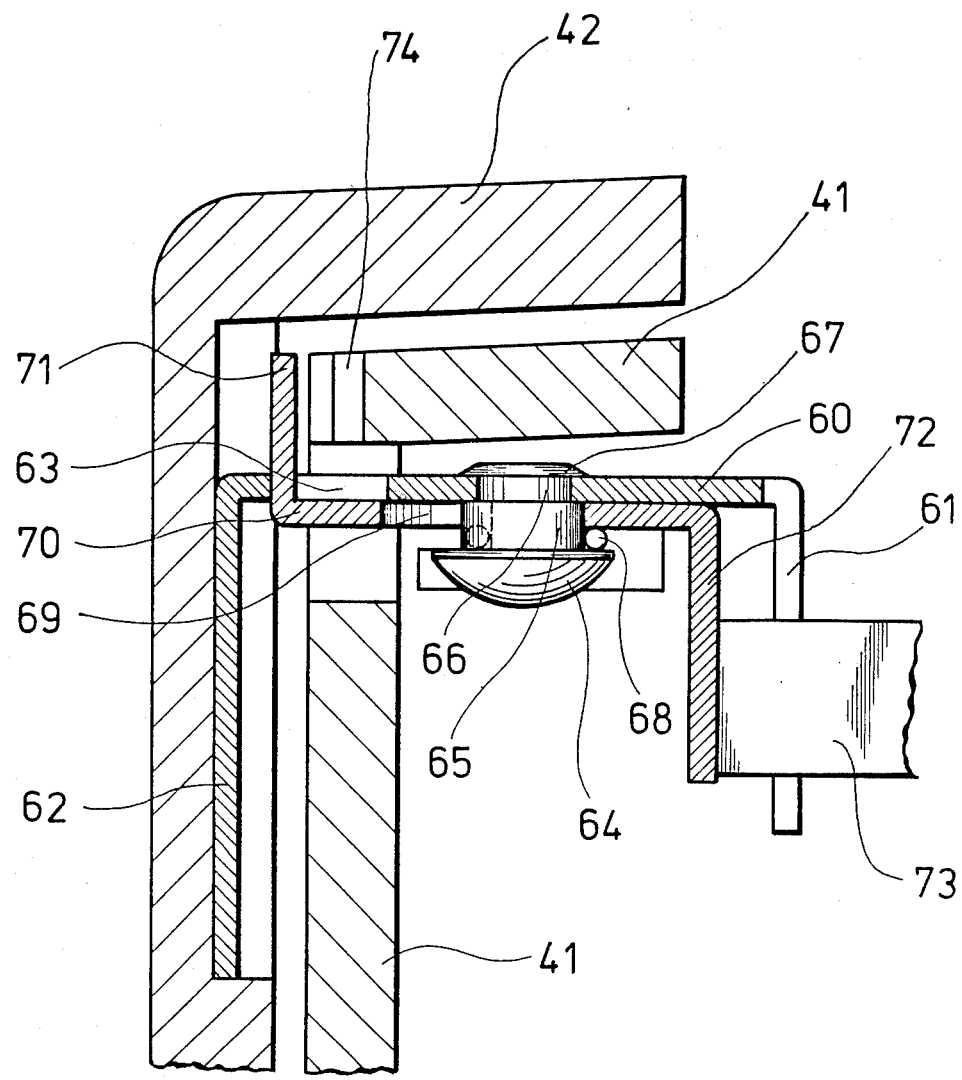
FIG. 6 shows a cross-section, to an enlarged scale, of a slider locking system.

FIG. 6 shows an arrangement for locking the slider 42 when the flap 41 is raised. Thus, said slider 42 can only be moved in the shut position of the flap 41 (cf FIG. 2) but not in the open or raised position thereof (cf FIG. 1). As a result, between the particular position of the slider 42 and the switched in electronic circuit there is always a fixed association. If it were possible to move the slider 42 in the position shown in FIG. 1, then the actual slider position would no longer coincide with the actual circuit connected in and which is associated with a specific function or item of equipment (e.g. a television). Thus, for example, "satellite tuner" could appear in the slot 45, whereas the actual electric circuit was set to "television".

Part of the slider 42 and part of the flap 41 are shown in section in FIG. 6. The flap 41 has two parts positioned perpendicularly to one another, the vertical part having an opening. A U-shaped part having two vertical webs 61,62 and a horizontal web 60 is connected to the inner wall of the slider 42. The horizontal web 60 carries a rivet which has a head 64, a cylindrical central part 65, a cylindrical lower part 66 and a frustum-like termination 67. Below the horizontal web 60 of the U-shaped part is provided a horizontal web 70 of a Z-shaped part having vertical webs 71 and 72. An elongated slot 69 is provided in the horizontal web 70 which slot allows a horizontal movement of the Z-shaped part relative to the U-shaped part. The fixed coupling of the slider 42 with the flap 41 takes place in the raised state of the flap in such a way that the Z-shaped part is moved to the right as viewed in FIG. 6 by the tension of a spring 68, so that the vertical part 71 engages in a cutout 74 in the flap 41. If the flap 41 and slider 42 are forced downwards, so that both assume the position shown in FIG. 2, then an element 73 coupled to the upper part 19 presses on the web 72, so that the Z-shaped part is moved to the left to the position shown in FIG. 6 and the vertical web 71 is disengaged from the cutout 74.

Figure 7:
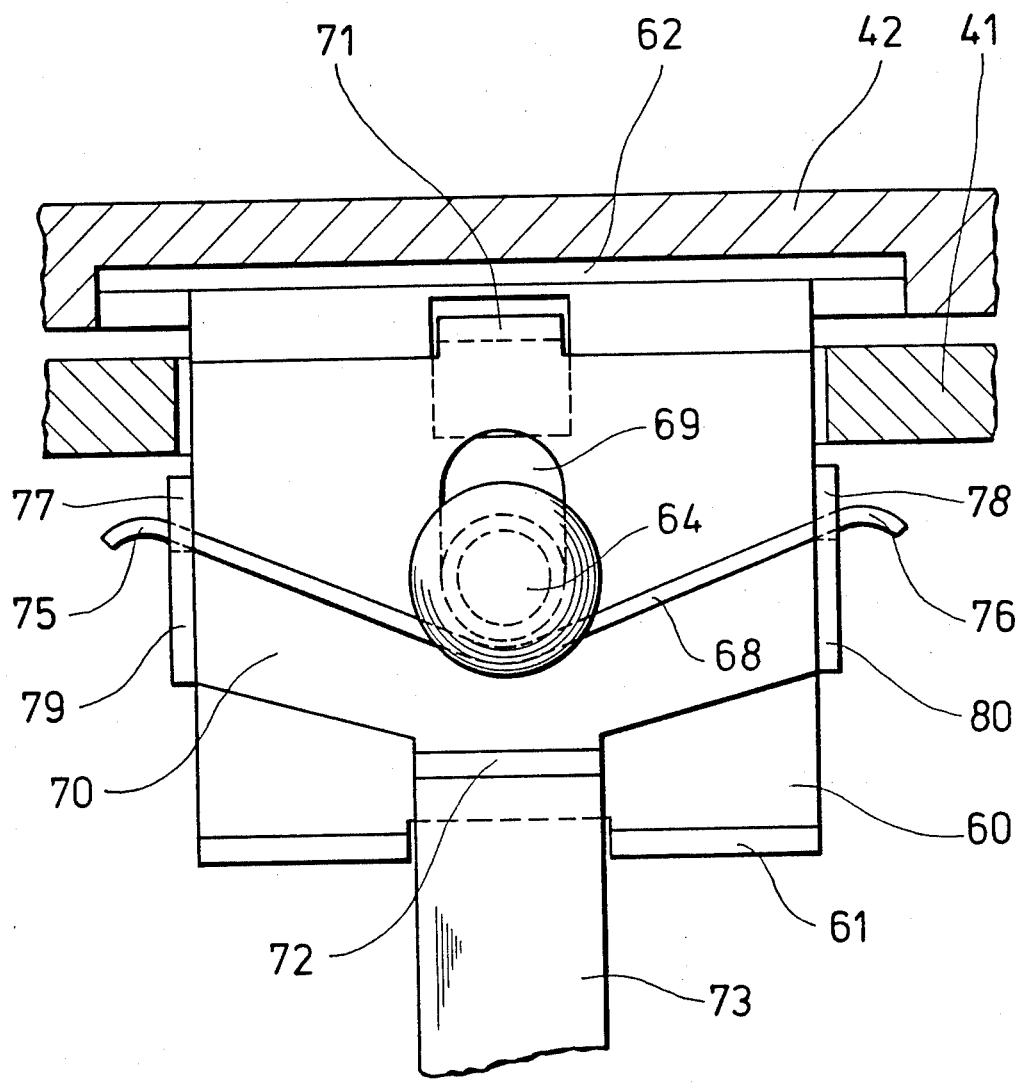
FIG. 7 shows another cross-section of the slider locking system shown in FIG. 6.

FIG. 7 shows another view of the arrangement shown in FIG. 6 and it is possible to see the slider 42 and flap 41 in a plan view on the rivet head 64. Thus, FIG. 7 shows the arrangement when viewing from the bottom to the top in FIG. 6. The U-shaped part appears in FIG. 7 as a flat part with edge webs 61 and 62. The Z-shaped part is also shown flat, the vertical webs 71 and 72 being relatively narrow. The outer ends 75 and 76 of the spring 68 engage respectively in recesses 77 and 78 formed in lateral faces 79 and 80 of the web 75 so that the horizontal web 70 is moved downwards as viewed in FIG. 7 if there is no opposing force. The horizontal web 70 of the Z-shaped part only moves upwards when the element 73 presses against the web 72 as shown in FIG. 7 so that the web 71 is disengaged.

The aforementioned remote control device has an electronic circuit which is not further described and, which forms part of the prior art and essentially contains an integrated circuit, e.g. the Valvo integrated circuit SAA 3004.

The invention is not restricted to the above-described embodiment but variations and modifications may be made without departing from the spirit and scope of the invention.

What is claimed is:

1. A remote control device for the joint or successive remote control of radio receivers, record players, tape recorders, television receivers and the like, the remote control device comprising a body having means for setting thereon controls for a particular item of particular equipment to be remotely controlled and said remote control device having a number of control members on said body enabling several functions to be set on the particular item of equipment to be remotely controlled, wherein said means for setting said controls of the remote control device comprise a plurality of drop sheets, each drop sheet being associated with a respective item of equipment to be remotely controlled and carrying indications of the functions of the control members on said remote control device for the remote control of said associated item of equipment, and each drop sheet having cutouts through which said control members can be passed, and in which a flap is pivotally mounted on said body of the remote control device, a slider being movably mounted on said flap and being capable of adopting a plurality of different positions in each of which the slider is arranged to connect different electrical contacts and to carry up a predetermined number of drop sheets when said slider is pivoted with the flap through a given angle with respect to said body of the remote control device, said slider being movable on the flap only when said flap is pivoted to a position in which it overlies the body of said remote control device, and in which a displaceable part is provided which makes it possible to form a fixed coupling between the slider and the flap, said displaceable part being displaceably arranged on a part fixed to the slider, said part having a web which engages in a cutout of the flap in a first position.

2. A remote control device as claimed in claim 1, in which the slider has a gripper arranged to engage said drop sheets.

3. A remote control device as claimed in claim 1, in which said drop sheets have in each case a cutout in an edge region thereof, said cutouts being different on each drop sheet.

4. A remote control device as claimed in claim 1, in which said body is subdivided into an upper part and a lower part, only the upper part being coverable by said flap.

5. A remote control device as claimed in claim 4, in which said upper part has a first plurality of operating buttons and said lower part has a second plurality of operating buttons.

6. A remote control device as claimed in claim 4, in which a compartment for receiving batteries is located below the upper part.

7. A remote control device as claimed in claim 1, in which said displaceable part is Z-shaped.

8. A remote control device as claimed in claim 7, in which an elongated hole is provided in the central region of said Z-shaped part, a connecting element, which is coupled to said part fixed to said slider, extending thru said elongated hole in the Z-shaped part.

9. A remote control device as claimed in claim 1, in which said displaceable part engages in a cutout provided in said flap when the flap is in the raised state as a result of the tension of a spring.

10. A remote control device as claimed in claim 9, in which an operating element is provided which, when the flap is pivoted to the position in which it overlies the body of the remote control device, presses against said displaceable part and consequently releases said part from the flap.

11. A remote control device as claimed in claim 9, in which said spring is applied to the shank of a rivet connection and its ends engage in recesses formed in said displaceable part.

* * * * *